(12) United States Patent
Kobayashi et al.

(10) Patent No.: US 7,165,473 B2
(45) Date of Patent: Jan. 23, 2007

(54) WAVE GEAR DEVICE HAVING INTERNAL GEAR INTEGRALLY FORMED WITH INNER RING OF BEARING

(75) Inventors: Masaru Kobayashi, Nagano (JP); Junichi Kurogi, Nagano (JP)

(73) Assignee: Harmonic Drive Systems Inc., Tokyo (JP)

( * ) Notice: Subject to any disclaimer, the term of this patent is extended or adjusted under 35 U.S.C. 154(b) by 164 days.

(21) Appl. No.: 11/063,823

(22) Filed: Feb. 23, 2005

(65) Prior Publication Data

US 2005/0217420 A1 Oct. 6, 2005

(30) Foreign Application Priority Data

Mar. 31, 2004 (JP) .............................. 2004-102989

(51) Int. Cl.
*F16H 33/00* (2006.01)

(52) U.S. Cl. ....................................................... 74/640

(58) Field of Classification Search ................. 74/640; 475/162
See application file for complete search history.

(56) References Cited

U.S. PATENT DOCUMENTS 3,147,640 A 9/1964 Musser 6,250,179 B1 6/2001 Shirasawa
2002/0174545 A1* 11/2002 Kiyosawa .............. 29/898.063
2002/0184766 A1 12/2002 Kobayashi et al.

FOREIGN PATENT DOCUMENTS

DE 102 22 698 A1 2/2003
JP 09-291983 11/1997

OTHER PUBLICATIONS

European Search Report dated Jul. 5, 2005 (2 pages).

* cited by examiner

*Primary Examiner*—Dirk Wright
(74) *Attorney, Agent, or Firm*—Flynn, Thiel, Boutell & Tanis, P.C.

(57) ABSTRACT

A wave gear device has a rigid internal gear, a flexible external gear, a wave generator, and a cross roller bearing for supporting the gears in a relatively rotatable manner. A toroidal composite member that functions as the rigid internal gear and an inner ring of the cross roller bearing has an inner ring-forming member that functions as the inner ring, and an internal teeth-forming member that functions as the rigid internal gear, and the internal teeth-forming member composed of a ductile casting is integrated by diffusion bonding with the inner ring-forming member composed of bearing steel.

3 Claims, 4 Drawing Sheets (Detail of Portion A)

WAVE GEAR DEVICE HAVING INTERNAL GEAR INTEGRALLY FORMED WITH INNER RING OF BEARING

FIELD OF THE INVENTION

The present invention relates to a wave gear device configured so as to generate relative rotation between a flexible external gear and an annular rigid internal gear by causing the flexible external gear to partially mesh with the annular rigid internal gear, and circumferentially moving meshing positions of the gears; and particularly relates to a wave gear device with a configuration in which the internal gear is integrated with an inner ring of a bearing that supports the gears in a relatively rotatable manner.

DESCRIPTION OF THE RELATED ART

Commonly known wave gear devices have an annular rigid internal gear, a flexible external gear disposed inside thereof, and an elliptically contoured wave generator. The flexible external gear is elliptically flexed by the wave generator so as to partially mesh with the rigid internal gear. When the wave generator is rotated by a motor or the like, meshing locations of the two gears move circumferentially. Since the difference in the number of teeth between the two gears is 2n (n is a positive integer), which is usually 2, relative rotational movement is produced between the two gears when the meshing position moves in the circumferential direction. When one gear is fixed in place, a reduced rotational output, which is reduced by a reduction gear ratio in correlation with the difference in the number of teeth, is output from the other gear.

A cross roller bearing is used in the wave gear device with this configuration in order to support the gears in a relatively rotatable manner. Proposed in JP-A 9-291983 is a wave gear device in which the cross roller bearing has an inner ring formed on its inner peripheral surface with internal teeth so that the inner ring and rigid internal gear are formed by a single member, whereby the size and weight of the device are reduced.

When the inner ring and the rigid internal gear are formed by a single member, a ductile casting is used in consideration of machining precision and abrasion resistance of the internal teeth. However, when a wave gear device is manufactured using a single member composed of a ductile casting in which an inner ring raceway surface and internal teeth are formed, it is occasionally impossible to ensure moment rigidity and a permissible moment load.

SUMMARY OF THE INVENTION

In view of the above, a main object of the present invention is to provide a wave gear device having an internal gear integrally formed with an inner ring of a bearing that has high machining precision and abrasion resistance of internal teeth, as well as high device rigidity and permissible moment load.

To solve the above and other problems, the wave gear device of the present invention has:
an annular rigid internal gear;
an annular flexible external gear;
a wave generator for radially flexing the flexible external gear to form partial meshing with the rigid internal gear and to circumferentially move meshing positions of the gears; and
a bearing for supporting the rigid internal gear and the flexible external gear in a relatively rotatable manner; wherein
an outer ring of the bearing is fixed to the flexible external gear; and
an inner ring of the bearing is a composite member in which the rigid internal gear is integrated; and wherein
the composite member comprises an annular inner ring-forming member, a raceway surface formed on an outer peripheral surface of the inner ring-forming member, an annular internal teeth-forming member integrated with an inner peripheral surface of the inner ring-forming member, and internal teeth formed on an inner peripheral surface of the internal teeth-forming member;
the inner ring-forming member is made of bearing steel;
the internal teeth-forming member is made of a ductile casting; and
the internal teeth-forming member is integrated with the inner ring-forming member by diffusion bonding.

A cross roller bearing is typically used as the bearing. A shape referred to as a "silk hat-type flexible external gear" may be used as the flexible external gear. The silk hat-type flexible external gear has a cylindrical trunk, an annular diaphragm that extends radially outward from one end of the trunk, an annular boss formed in a continuous fashion on an outer peripheral edge of the diaphragm, and external teeth formed on an outer peripheral surface of the trunk. In this case, the bearing is coaxially disposed outside the trunk, and the outer ring is fastened to the boss with a toroidal end face thereof in contact with a toroidal end face of the boss.

In the wave gear device in accordance with the present invention as described above, the composite member that functions as the inner ring of the bearing and the internal gear has a configuration in which the internal teeth-forming member composed of a ductile casting is integrated by diffusion bonding with the inner ring-forming member composed of bearing steel. Accordingly, the size and weight of the apparatus can be reduced in a manner similar to the case in which an inner ring portion and an internal teeth portion are formed in a single member. At the same time, internal teeth that have good precision and high abrasive resistance can be formed, and the rigidity of the device and the permissible moment load can be increased.

DESCRIPTION OF THE PREFERRED EMBODIMENTS

Embodiments of the wave gear device according to the present invention are described hereinbelow with reference to the diagrams.

Figure 1:
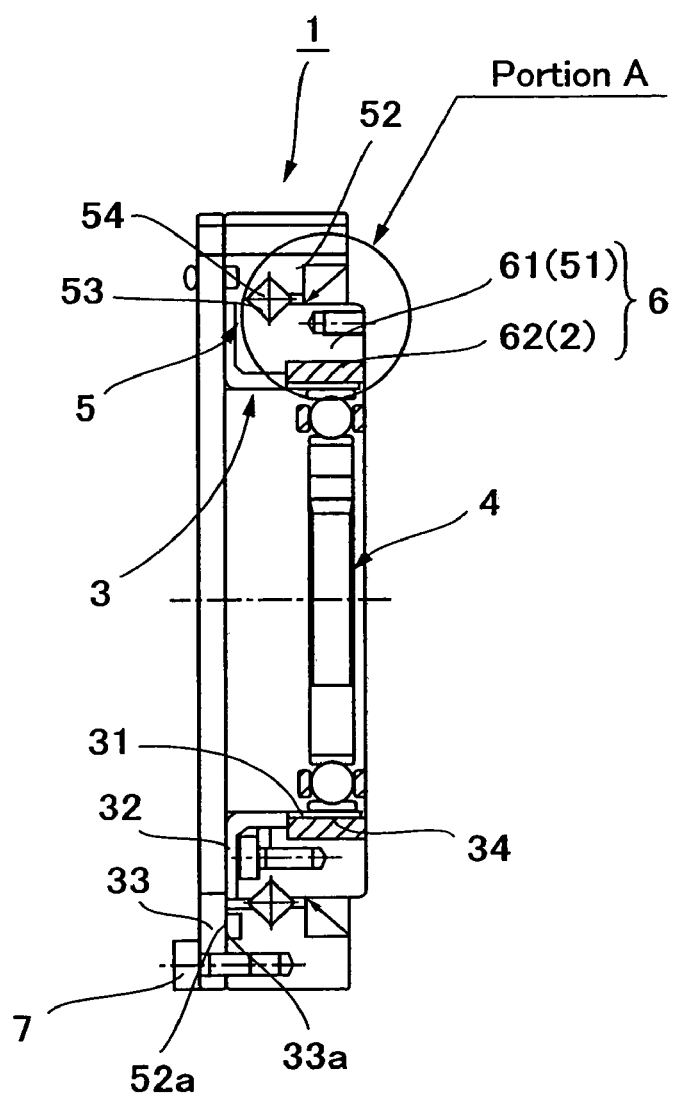
FIG. 1 is a cross-sectional view showing a silk hat-type wave gear device according to the present invention.
Figure 2:
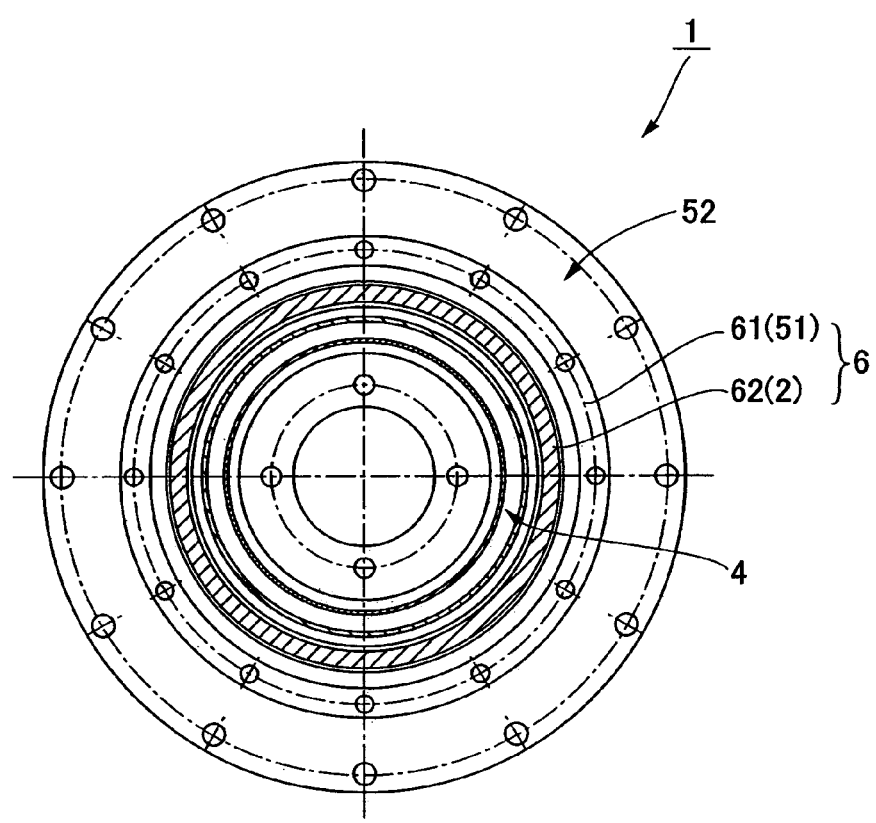
FIG. 2 is a right side end view of the wave gear device in FIG. 1.
Figure 3:
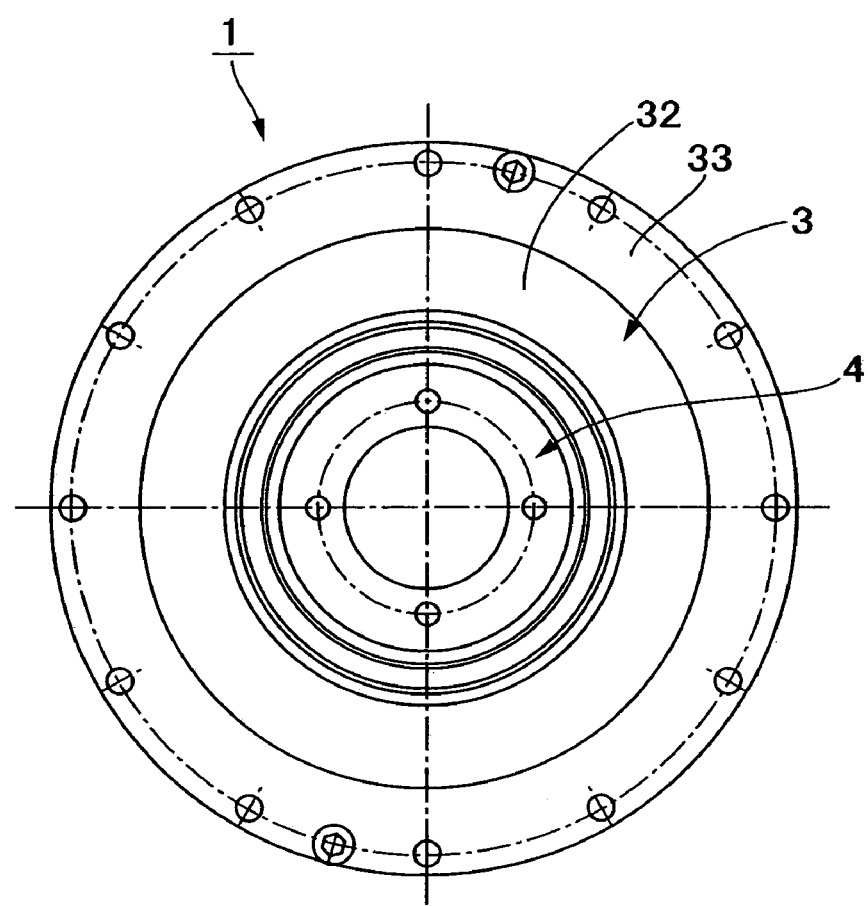
FIG. 3 is a left side end view of the wave gear device in FIG. 1.
Figure 4:
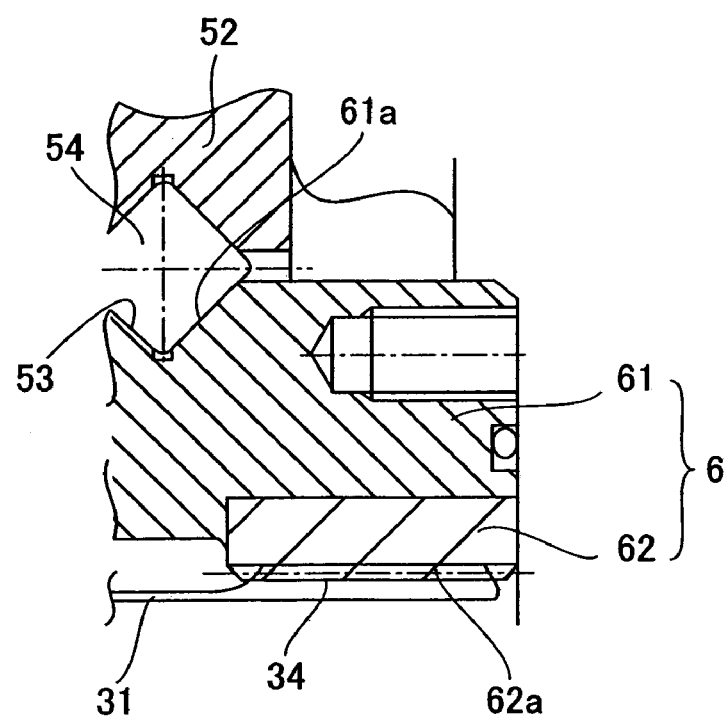
FIG. 4 is a partial enlarged cross-sectional view of the wave gear device in FIG. 1.

FIGS. 1, 2, and 3 are a cross-sectional view, a right side end face view, and a left side end face view of a silk hat-type wave gear device of the present invention. FIG. 4 is a partial enlarged cross-sectional view thereof. The wave gear device 1 has an annular rigid internal gear 2, a silk hat-shaped flexible external gear 3 disposed coaxially inside the rigid internal gear, an elliptically contoured wave generator 4 fitted into the flexible external gear, and a cross roller bearing 5 for supporting the rigid internal gear 2 and the flexible external gear 3 in a relatively rotatable manner.

The silk hat-shaped flexible external gear 3 has a cylindrical trunk 31, an annular diaphragm 32 that widens radially outward from one end of the trunk 31, an annular boss 33 formed in a continuous fashion on an outer peripheral edge of the diaphragm 32, and external teeth 34 formed on an outer peripheral surface of the opposite end side portion of the trunk 31. The trunk 31 of the flexible external gear 3 is coaxially enclosed in the cross roller bearing 5 with substantially the same width as the trunk 31.

The cross roller bearing 5 has an annular inner ring 51, an annular outer ring 52, and a plurality of columnar rollers 54 rollably inserted in an alternately perpendicular manner into an annular raceway 53 with a rectangular cross section formed therebetween. The size of a toroidal end face 52a of the outer ring 52 corresponds to the size of a toroidal end face 33a of the boss 33 of the flexible external gear 3, and both these members are fastened with a fastening bolt 7 so that the toroidal end faces 52a and 33a thereof are in contact with each other.

The rigid internal gear 2 and inner ring 51 of the present embodiment are composed of a toroidal composite member 6. The composite member 6 has an annular inner ring-forming member 61 that functions as the inner ring 51, and an annular internal teeth-forming member 62 that functions as the rigid internal gear 2 integrated with an inner peripheral surface of the inner ring-forming member 61. A raceway surface 61a is formed on an outer peripheral surface of the inner ring-forming member 61, and internal teeth 62a are formed on an inner peripheral surface of the internal teeth-forming member 62. The inner ring-forming member 61 is made of bearing steel, and the internal teeth-forming member 62 is formed from a ductile casting. The internal teeth-forming member 62 is integrated with the inner ring-forming member 61 by diffusion bonding.

In the wave gear device 1 with this configuration, a portion of the flexible external gear 3 where the external teeth 34 are formed are elliptically flexed by the wave generator 4, and portions of the external teeth 34 positioned at both ends in a major axis direction of the elliptical shape thereof mesh with portions of the internal teeth 62a of the rigid internal gear 2. For example, when the rigid internal gear 2 (composite member 6) is fixed and the wave generator 4 is rotated by a motor (not shown) or the like, the meshing positions of the gears 2 and 3 move in a circumferential direction and reduced rotation is output from the flexible external gear 3.

In the present embodiment, the rigid internal gear 2 and inner ring 51 are formed from the composite member 6, and the size and weight of the device can therefore be reduced. Since the rigid internal gear 2 is formed by the internal teeth-forming member 62 composed of a ductile casting in the composite member 6, the machining precision and abrasion resistance of the internal teeth 62a are high. Furthermore, since the inner ring 51 is formed by the inner ring-forming member 61 composed of bearing steel in the composite member 6, the rigidity and permissible moment load of the cross roller bearing 5 are high, and the rigidity and permissible moment load of the device 1 are therefore also high.

In the present embodiment, the cross roller bearing 5 is used as the bearing for holding the gears 2 and 3 in a relatively rotatable manner, but ball bearings or the like may also be used.

What is claimed is:

1. A wave gear device, comprising:
   an annular rigid internal gear;
   an annular flexible external gear;
   a wave generator for radially flexing the flexible external gear to form partial meshing with the rigid internal gear and to circumferentially move meshing positions of the gears; and
   a bearing for supporting the rigid internal gear and the flexible external gear in a relatively rotatable manner; wherein
   an outer ring of the bearing is fixed to the flexible external gear, and
   an inner ring of the bearing is a composite member in which the rigid internal gear is integrated; and wherein
   the composite member comprises an annular inner ring-forming member, a raceway surface formed on an outer peripheral surface of the inner ring-forming member, an annular internal teeth-forming member integrated with an inner peripheral surface of the inner ring-forming member, and internal teeth formed on an inner peripheral surface of the internal teeth-forming member;
   the inner ring-forming member is composed of bearing steel;
   the internal teeth-forming member is composed of a ductile casting; and
   the internal teeth-forming member is integrated with the inner ring-forming member by diffusion bonding.

2. The wave gear device according to claim 1, wherein the bearing is a cross roller bearing.

3. The wave gear device according to claim 2, wherein the flexible external gear comprises a cylindrical trunk, an annular diaphragm that extends radially outward from one end of the trunk, an annular boss formed in a continuous fashion on an outer peripheral edge of the diaphragm, and external teeth formed on an outer peripheral surface of the trunk, and wherein
   the bearing is coaxially disposed outside the trunk, and the outer ring is fastened to the boss with the toroidal end face thereof in contact with the toroidal end face of the boss.

* * * * *